US008656142B2

(12) United States Patent
Chen et al.

(10) Patent No.: US 8,656,142 B2
(45) Date of Patent: Feb. 18, 2014

(54) MANAGING MULTIPLE SPECULATIVE ASSIST THREADS AT DIFFERING CACHE LEVELS

(75) Inventors: Tong Chen, Yorktown Heights, NY (US); Yaoqing Gao, Toronto (CA)

(73) Assignee: International Business Machines Corporation, Armonk, NY (US)

(*) Notice: Subject to any disclaimer, the term of this patent is extended or adjusted under 35 U.S.C. 154(b) by 787 days.

(21) Appl. No.: 12/903,620

(22) Filed: Oct. 13, 2010

(65) Prior Publication Data

US 2011/0093687 A1    Apr. 21, 2011

(30) Foreign Application Priority Data

Oct. 16, 2009  (CA) .................................. 2680601

(51) Int. Cl.
*G06F 9/30*        (2006.01)
(52) U.S. Cl.
USPC ......................................................... 712/207
(58) Field of Classification Search
None
See application file for complete search history.

(56) References Cited

U.S. PATENT DOCUMENTS

| 7,484,041 B2* | 1/2009 | Yoshikawa ..................... 711/137 |
| 7,502,910 B2* | 3/2009 | Damron ........................... 712/34 |
| 2005/0154860 A1 | 7/2005 | Arimilli et al. |
| 2008/0282064 A1 | 11/2008 | Day et al. |

* cited by examiner

*Primary Examiner* — Andrew Caldwell
*Assistant Examiner* — Benjamin Geib
(74) *Attorney, Agent, or Firm* — Martin J. McKinley; Law Office of Jim Boice

(57) ABSTRACT

An illustrative embodiment provides a computer-implemented process for managing multiple speculative assist threads for data pre-fetching that sends a command from an assist thread of a first processor to second processor and a memory, wherein parameters of the command specify a processor identifier of the second processor, responsive to receiving the command, reply by the second processor indicating an ability to receive a cache line that is a target of a pre-fetch, responsive to receiving the command replying by the memory indicating a capability to provide the cache line, responsive to receiving replies from the second processor and the memory, sending, by the first processor, a combined response to the second processor and the memory, wherein the combined response indicates an action, and responsive to the action indicating a transaction can continue sending the requested cache line, by the memory, to the second processor into a target cache level on the second processor.

20 Claims, 12 Drawing Sheets

300

302 {
```
main thread:
    while the loop {
        work in the loop body;
        main_thread_pace++;
    }
```

304 {
```
the assist thread:
    while the loop {
        work for address computation;
        dcbt(address);
        assist_thread_pace++;
        do nop while (assist_thread_pace-mainthread_pace >= MAX_D);
    }
```

(Prior Art)

FIG. 3

```
void * address_buffer[MAX_DL3];
int last_dcbt = 0;

while the loop {
work for the address computation;
dcbtst(address) to pre-fetch data at L3;
address_buffer[assist_thread_pace mod MAX_DL3] = address;

for (i = max(last_dcbt, main_thread_pace); i < min(assist_thread_pace,
main_thread_pace+MAX_DL1); i++) {
dcbt(address_buffer[i mod MAX_DL3]);
}
last_dcbt = i;
do nop while (assist_thread-pace-mainthread_pace >= MAX_DL3);
assist_thread_pace++;
}
```

FIG. 5

```
void * address_buffer[MAX_DL3];
int last_dcbt = 0;
``` first assist thread    412

```
while the loop {
work for the address computation;
dcbtst(address) to pre-fetch data at L3;
address_buffer[assist_thread_pace mod MAX_DL3] = address;
do nop while (assist_thread-pace-mainthread_pace >= MAX_DL3);
assist_thread_pace++;
}
```

702 second assist thread    612

```
while the loop {
do nop while (max(last_dcbt, main_thread_pace) >= min(assist_thread_pace,
main_thread_pace+MAX_DL1));
for (i = max(last_dcbt, main_thread_pace); i < min(assist_thread_pace,
main_thread_pace+MAX_DL1); i++) {
dcbt(address_buffer[i mod MAX_DL3]);
}
last_dcbt = i;
}
```

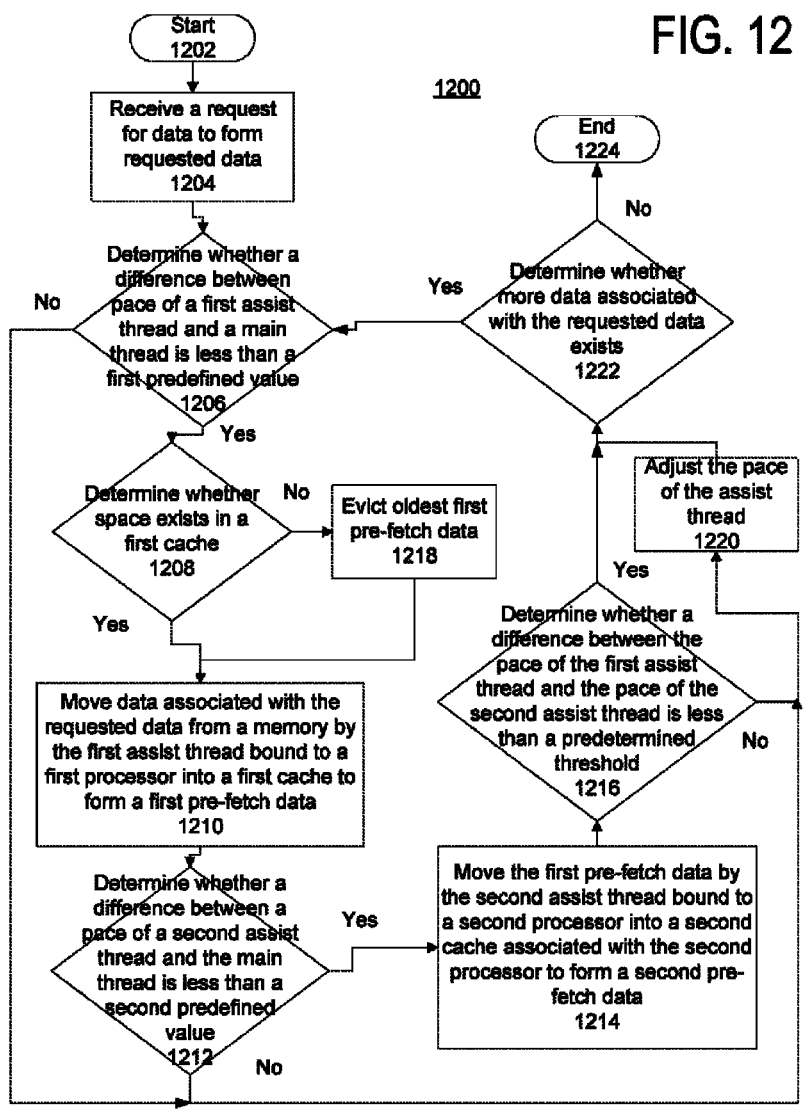

MANAGING MULTIPLE SPECULATIVE ASSIST THREADS AT DIFFERING CACHE LEVELS

STATEMENT OF GOVERNMENT RIGHTS

This invention was made with Government support under Contract number HR0011-07-9-0002 awarded by the Defense Advanced Research Projects Agency (DARPA). The Government has certain rights in this invention.

CROSS-REFERENCE TO RELATED APPLICATIONS

Pursuant to 35 U.S.C. 119, Applicant claims a right of priority to Canadian Patent Application No. 2,680,601 filed 16 Oct. 2009.

BACKGROUND

This disclosure relates generally to a data processing system and, more specifically, to managing multiple speculative assist threads for differing cache levels for data pre-fetching within a data processing system.

When an assist thread is used to pre-fetch data for a main thread executing within a program, there are typically issues of controlling the pace of execution between the main thread and the assist thread, and selecting a binding between the main thread and the assist thread to processor cores. Thread performance may be dependent on control of the pace between the assist thread and the main thread. In one instance, the assist thread needs to run ahead of the main thread far enough so delay of a cache miss can be hidden by the pre-fetch instructions. It is desirable to have the pre-fetched data arrive just before the main thread needs to use the data. In such cases, the latency of the cache miss is fully hidden. On the other hand, the assist thread should not run too far ahead of the main thread because the pre-fetched data may cause useful data to be evicted from the cache. The eviction of useful data is known as cache pollution by pre-fetch.

Current solutions attempt to determine and use a parameter to control the pace difference between the assist thread and the main thread. The solutions attempt to select an ideal value for use in minimizing latency and cache pollution. A difficulty of such solutions is that the selected pace distance may be not an optimal pace distance to reduce the latency and cache pollution at the same time. In some cases, while attempting to avoid cache pollution with a smaller pace difference, the solution cannot fully hide the latency of memory accesses. While attempting to fully hide the latency by using a larger pace difference, cache pollution is introduced as a consequence.

With respect to binding of the main thread and assist thread to a processor core, a main thread and assist thread can be bound as chip multiprocessor (CMP) threads or simultaneous multithreaded (SMT) threads. When simultaneous multi-threaded threads are used, resource contention may occur. When chip multiprocessor threads are used, the data can be only pre-fetched into a cache level shared by chip multiprocessor threads. In some systems, the shared cache is quite far away from a processor and benefit of pre-fetch is not fully utilized. Current solutions force a choice between either chip multiprocessor threads or simultaneous multithreaded threads.

The same processor that will consume the pre-fetched data typically issues pre-fetch instructions, thereby adding to the load on the processor. Therefore, the location in the memory hierarchy to which the data should be pre-fetched is assumed to have affinity to the processor or processor core from which the pre-fetch instruction is issued. Usually, the data is brought into the memory component closest to the processor core, which is typically level 1 cache.

SUMMARY

According to one embodiment, a computer-implemented process for managing multiple speculative assist threads for data pre-fetching is presented. The computer-implemented process sends a command from an assist thread of a first processor to second processor and a memory, wherein parameters of the command specify a processor identifier of the second processor, responsive to receiving the command, reply by the second processor indicating an ability to receive a cache line that is a target of a pre-fetch, responsive to receiving the command replying by the memory indicating a capability to provide the cache line, responsive to receiving replies from the second processor and the memory, sending, by the first processor, a combined response to the second processor and the memory, wherein the combined response indicates an action, and responsive to the action indicating a transaction can continue sending the requested cache line, by the memory, to the second processor into a target cache level on the second processor.

According to another embodiment, a computer program product for managing multiple speculative assist threads for data pre-fetching is presented. The computer program product comprises a computer recordable-type media containing computer executable program code stored thereon. The computer executable program code comprises computer executable program code for computer executable program code for sending a command from an assist thread of a first processor to second processor and a memory, wherein parameters of the command specify a processor identifier of the second processor, computer executable program code, responsive to receiving the command, for replying, by the second processor, indicating an ability to receive a cache line that is a target of a pre-fetch, computer executable program code, responsive to receiving the command, for replying by the memory indicating a capability to provide the cache line, computer executable program code, responsive to receiving replies from the second processor and the memory, for sending a combined response from the first processor to the second processor and the memory, wherein the combined response indicates an action, and computer executable program code, responsive to the action indicating a transaction can continue, for sending the requested cache line to the second processor into a target cache level on the second processor from the memory.

According to another embodiment, an apparatus for apparatus for managing multiple speculative assist threads for data pre-fetching is presented. The apparatus comprises a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit executes the computer executable program code to direct the apparatus to send a command from an assist thread of a first processor to second processor and a memory, wherein parameters of the command specify a processor identifier of the second processor, responsive to receiving the command, reply by the second processor indicating an ability to receive a cache line that is a target of a pre-fetch, responsive to receiving the command reply by the memory indicating a capability to provide the cache line, responsive to receiving replies from the second processor and the memory, send, by the first processor, a combined response to the second processor and the memory, wherein the combined response indicates an action, and responsive to the action indicating a transaction can continue, send the requested cache line, by the memory, to the second processor into a target cache level on the second processor.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 3 is a textual representation of a code portion of a main thread with assist thread implementation;

FIG. 5 is a textual representation of a code portion of a main thread with assist thread implementation of FIG. 4, in accordance with one embodiment of the disclosure;

FIG. 7 is a textual representation of a code portion of a main thread with multiple assist threads implementation of FIG. 6, in accordance with one embodiment of the disclosure;

FIG. 12 is a flowchart of using a main thread with multiple assist threads implementation of FIG. 6, in accordance with one embodiment of the disclosure.

DETAILED DESCRIPTION

Figure 1:
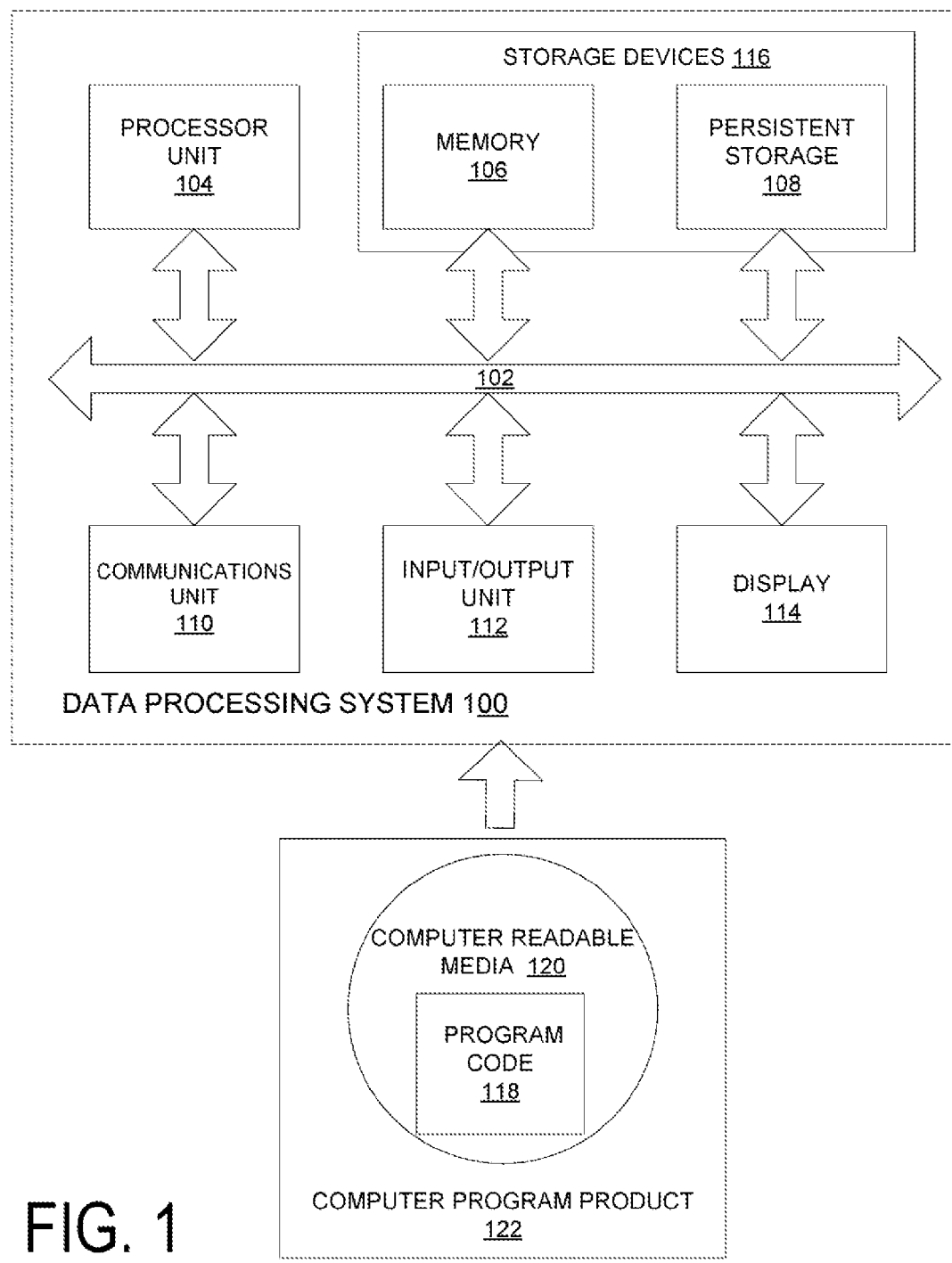
FIG. 1 is a block diagram of an exemplary data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product tangibly embodied in any medium of expression with computer usable program code embodied in the medium.

Any combination of one or more computer readable medium may be utilized. The computer readable medium may be a computer readable signal media or a computer readable storage media. A computer readable storage media may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing. In the context of this document, a computer readable storage media may be any tangible medium that can contain, or store a program for use by or in connection with an instruction execution system, apparatus or device.

A computer readable signal media may include a propagated data signal with computer readable program code embodied therein; for example, in baseband or as part of a carrier wave. Such a propagated signal may take any of a variety of forms, including, but not limited to, electro-magnetic, optical or any suitable combination thereof. A computer readable signal media may be any computer readable medium that is not a computer readable storage media and that can communicate, propagate, or transport a program for use by or in connection with an instruction execution system, apparatus or device. Program code embodied in a computer readable signal media may be transmitted using any appropriate medium, including but not limited to wireless, wire line, optical fiber cable, RF, etc., or any suitable combination of the foregoing.

Computer program code for carrying out operations of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

FIG. 1 is a block diagram of an exemplary data processing system operable for various embodiments of the disclosure. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be multi-processor cores, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type. A processor within a multi-processor unit may also be referred to as a processor core or core.

Memory 106 and persistent storage 108 are examples of storage devices 116. A storage device is any piece of hardware that is capable of storing information; for example and without limitation, data, program code in functional form, and/or other suitable information either on a temporary basis and/or a permanent basis. In these examples, memory 106 may be a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code, which may be read and executed by a processor in processor unit 104. The program code in the different embodiments may be embodied on different physical or tangible computer readable media, such as memory 106 or persistent storage 108.

Program code 118 is located in a functional form on computer readable medium 120, which is selectively removable and may be loaded onto or transferred to data processing system 100 for execution by processor unit 104. Program code 118 and computer readable medium 120 form computer program product 122 in these examples. In one example, computer readable medium 120 may be in a tangible form; for example, an optical or magnetic disc that is inserted or placed into a drive or other device that is part of persistent storage 108 for transfer onto a storage device, such as a hard drive that is part of persistent storage 108. In a tangible form, computer readable medium 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable medium 120 through a communications lik to communications unit 110 and/or through a connection to input/output unit 112. The communications link and/or the connection may be physical or wireless in the illustrative examples. The computer readable medium also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache, such as found in an interface and memory controller hub that may be present in communications fabric 102.

According to an illustrative embodiment, a computer-implemented process for managing multiple speculative assist threads for data pre-fetching is presented. Using data processing system 100 of FIG. 1 as an example, an illustrative embodiment provides the computer-implemented process stored in memory 106, and executed by processor unit 104. In an example, the computer-implemented sends a command from an assist thread of a first processor, such as processor 104, to a second processor and a memory such as memory 106, wherein the command specifies parameters including a processor identifier of the second processor. Responsive to receiving the command, the second processor replies to the first processor indicating an ability to receive a cache line that is a target of a pre-fetch. Responsive to receiving the command, memory 106 replies indicating a capability to provide the cache line and, responsive to receiving replies from the second processor and the memory, the first processor sends a combined response to the second processor and the memory, wherein the combined response indicates an action. Responsive to the action indicating a transaction can continue, the requested cache line is sent by memory 106 to the second processor into a target cache level on the second processor.

Processor 104 further gathers dynamic cache profiling information from storage devices 116 or from processor unit 104 to form dynamic profiling information. Processor 104 further identifies delinquent load instructions at each cache level using static analysis for program code 118 received through communications unit 110, input/output unit 112 or storage devices 116 and the dynamic profiling information to form identified delinquent load instructions, identifies candidate code regions associated with the identified delinquent load instructions, and selects a candidate code region from the identified code regions to form a selected candidate code region. Processor 104 performs a cost analysis on the selected candidate code region to identify a number of assist threads to generate for the selected candidate code region to form the number of identified assist threads, and generates the number of identified assist threads for the selected candidate code region, wherein an assist thread is generated per each cache level. Processor 104 executes the number of identified assist threads for the selected candidate code region.

In an alternative embodiment, program code 118 containing the computer-implemented process may be stored within computer readable media 120 as computer program product 122. In another illustrative embodiment, the process for managing multiple speculative assist threads for data pre-fetching may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 2:
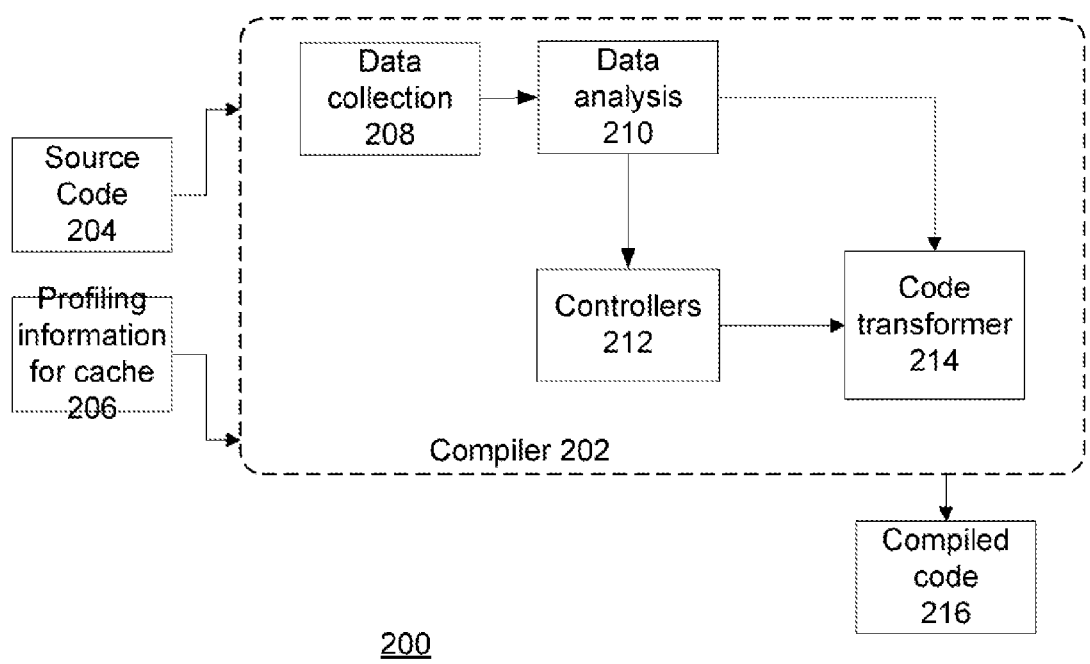
FIG. 2 is a block diagram of a compilation system that may be implemented within the data processing system of FIG. 1, in accordance with various embodiments of the disclosure.

FIG. 2 is a block diagram of a compilation system that may be implemented within the data processing system of FIG. 1, in accordance with various embodiments of the disclosure. Compilation system 200 comprises a number of components necessary for compilation of source code into computer executable program code or computer executable instructions. Components of compilation system 200 include, but are not limited to, compiler 202, source code 204, profiling information for cache 206, data collection 208, data analysis 210, controllers 212, code transformer 214 and compiled code 216.

Compilation system 200 receives input into compiler 202 in the form of source code 204 and profiling information for cache 206. Source code 204 provides the programming language instructions for the application of interest. The application may be a code portion of an application, a function, procedure or other compilation unit for compilation. Profiling information for cache 206 represents information collected for cache accesses. The access information typically includes cache element hit and cache element miss data. The information may further include frequency, location and count data.

Data collection 208 provides a capability to receive input from sources outside the compiler, as well as inside the compiler. The information is collected and processed using a component in the form of data analysis 210. Data analysis 210 performs statistical analysis of cache profiling data and other data received in data collection 208. Data analysis 210 comprises a set of services capable of analyzing the various types and quantity of information obtained in data collection 208. For example, if cache access information is obtained in data collection 208, data analysis 210 may be used to derive location and count information for each portion of the cache that is associated with a cache hit or a cache miss. Further analysis may also be used to determine frequency of access for a cache location. Data analysis 210 also provides information on when and where to place assist threads designed to help in data pre-fetch operations. Data pre-fetch operations provide a capability to manage data access for just-in-time readiness in preparation for use by the application.

Controllers 212 provide a capability to manage data pre-fetch activity. For example, controllers 212 may be used to monitor and adjust synchronization between a main thread of an application and a set of assist threads used to prime data for the main thread. The set of assist threads consists of one or more assist threads working in conjunction with a specific main thread. The set, therefore, may comprise a single assist thread or multiple assist threads as required. The set of assist threads makes ready data for consumption by the associated main thread. Adjustment includes timing of the assist thread relative to the execution of the main thread. Controllers 212 provide a set of one or more control functions. The set of one or more control functions comprises capabilities including version control, distance control and loop blocking factors that may be implemented as a set of one or more cooperating components. Pre-fetch thresholds are also included within controllers 212. Pre-fetch thresholds are used to determine whether assist thread execution relative to an associated main thread execution is within required bounds.

Code transformer 214 provides a capability to modify the source code to typically insert assist thread function where needed. The functional integrity of the source code is not altered by placement of assist thread code. For example, when a code block is analyzed and a determination is made to add an assist thread, code transformer 214 provides the code representing the assist thread at the specific location within the main thread. Addition of the assist thread includes necessary setup and termination code for proper execution.

Compiled code 216 is the result of processing source code 204 and any profiling information for cache 206 through compiler 202. Compiled code 216 may or may not contain assist threads as determined by data analysis 210 and controllers 212.

FIG. 3 is a textual representation of a code portion of a main thread with assist thread implementation. Code snippet 300 provides an example of current main thread 302 and assist thread 304 implementation. A portion of code representing main thread 302 executes at a main thread pace while a corresponding portion of code representing assist thread 304 executes at an assist thread pace.

The example illustrates one assist thread helping one main thread. Therefore, assist thread 304 is required to move all data in a single operation from a source location to a target location for main thread 302.

Figure 4:
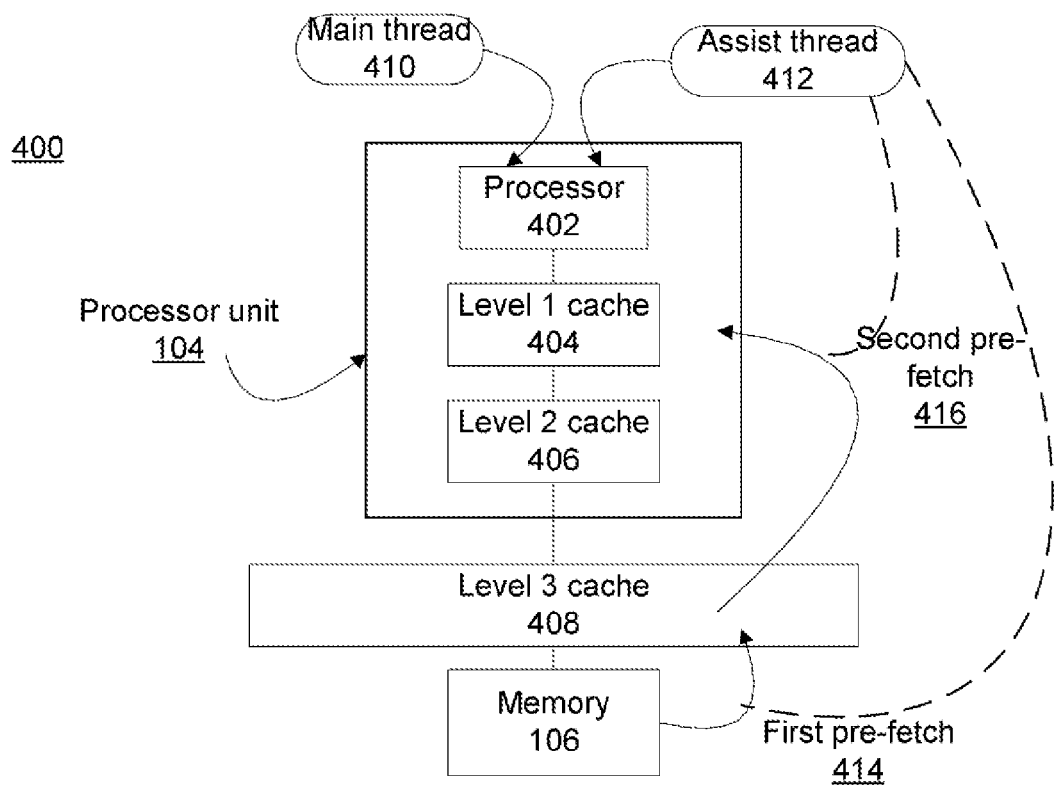
FIG. 4 is a block diagram of a main thread with assist thread implementation, in accordance with one embodiment of the disclosure.

FIG. 4 is a block diagram of a main thread with assist thread implementation, in accordance with one embodiment of the disclosure. System 400 is an example of data processing system 100 of FIG. 1 using compilation system 200 of FIG. 2. System 400 comprises a number of components including processor unit 104 and memory 106 from data processing system 100 of FIG. 1. Processor unit 104 is further detailed to show processor 402, level 1 cache 404, level 2 cache 406 and level 3 cache 408. In addition, main thread 410 is depicted as bound to processor 402, as is assist thread 412.

The speed gap between the processing unit and the main memory is growing wider and wider. A cache is a smaller but faster memory that is used to store the most frequently used data. When the processor needs to access a data, the processor checks whether the data resides in the cache. If the data is in the cache (called a cache hit), the processor reads the data quickly from the cache, avoiding the long latency of accessing the main memory. As a result, the average data access time can be typically reduced.

To balance the cache size and latency, multiple levels of cache are commonly used in modern processors. The cache closer to the main processor is faster, but of smaller size. The level number of cache is usually numbered increasingly when the cache is further away from the CPU. The level 1 cache, or L1 cache, is the closest to the processor.

The pre-fetch instruction is designed to bring a data into the cache before the data is used so that the latency of cache miss can be hidden. The pre-fetch instruction is non-blocking and does not wait for the data to arrive. The pre-fetch instruction is also speculative and it will drop the fetch request if certain exceptions occur. The data fetched by a pre-fetch instruction is put into a cache. When the data is actually used, the load instruction is likely to hit the cache and get the data quickly from the cache.

An operation moving data from memory 106 into level 1 cache 404 is shown as a two-stage process. A single assist thread 412 performs both stages. A first pre-fetch 414 invoked by assist thread 412 occurs to stage the data from memory 106 into level 3 cache 408. A second pre-fetch 416 is performed by assist thread 412 to move the staged data from level 3 cache 408 into level 1 cache 404. Pre-fetching of data in this example requires staged movement of data for use by main thread 410 from a lower level of cache hierarchy to a higher level of cache hierarchy by assist thread 412.

Assist thread 412 operates on the same processor, as does main thread 410. Assist thread 412 thus performs data pre-fetch cache data movement for main thread 410.

FIG. 5 is a textual representation of a code portion of a main thread with assist thread implementation of FIG. 4, in accordance with one embodiment of the disclosure. Code snippet 500 represents a code portion for moving data from a memory into a cache level 3 upwards to a cache level 1. Code portion 502 includes statements 504 for cache level 3 and statements 506 for cache level 1 data movement. For example statements 506 depict thread-pacing considerations in the form of assist_thread_pace and main_thread_pace.

Pre-fetching of data from level 3 cache 408 into level 1 cache 404 of FIG. 4 occurs according to the pace of the assist thread to place data from level 3 cache into level 1 cache while space permits. When a difference between assist_thread_pace and main_thread_pace is greater than or equal to a pre-fetch threshold value of MAX_DL3 no action occurs.

Suppose that the pace of main thread 410 of FIG. 4 is recorded by the count variable, main_thread_pace, and the pace of the assist thread 412 of FIG. 4 is recorded by the counter variable assist_thread_pace. The pace counter will be increased by one after each iteration has been finished. Assume the maximum pace difference allowed is a pre fetch threshold of MAX_D. Assume the maximum pace difference allowed for level 3 cache is MAX_DL3 and for level 1 cache is MAX_DLL, the main thread is the same as the previous example of FIG. 3; however, the assist thread is split and uses both a level 3 cache and a level 1 cache pacing.

Figure 6:
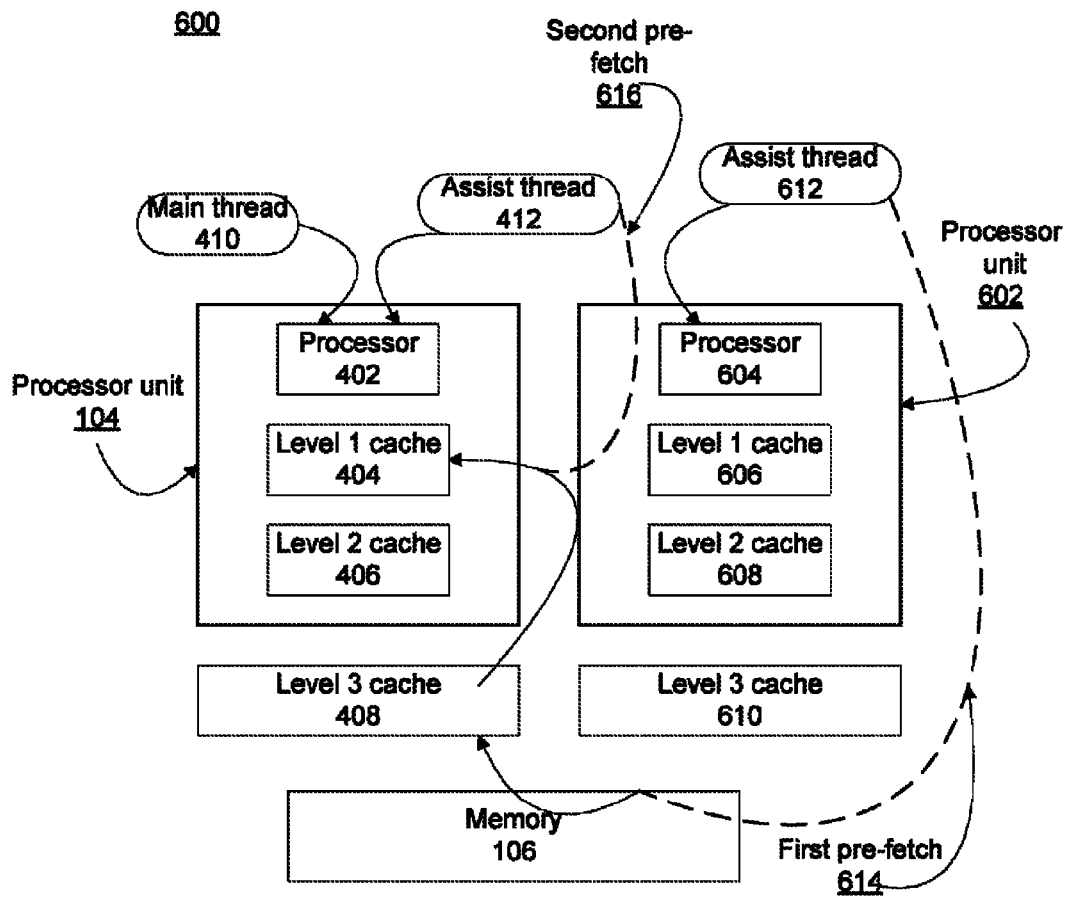
FIG. 6 is a block diagram of a main thread with multiple assist threads implementation, in accordance with one embodiment of the disclosure.

FIG. 6 is a block diagram of a main thread with multiple assist threads implementation, in accordance with one embodiment of the disclosure. System 600 comprises a combination of systems, such as that of data processing system 100 of FIG. 1 and system 400 of FIG. 4.

When an assist thread is used to pre-fetch data for the main thread, the helper thread typically executes faster than the main thread because the assist thread contains only the address computation for the delinquent loads and the pre-fetch instruction is a non-blocking instruction. Without control, the assist thread may run too far ahead of the main thread, causing cache pollution by pre-fetching too much data. Therefore, synchronization is usually needed to control the pace of the two threads and, therefore, the respective difference between the execution times. One typical implementation uses a counter for the progress of the main thread and a counter for the assist thread. The assist thread code periodically checks the difference between the two counters. If the difference is larger than a predetermined pre-fetch threshold, the assist thread is instructed to wait.

In order to obtain optimal performance, the pre-fetch threshold should be set small enough so that the pre-fetched data will not cause notable cache pollution, and large enough so that the data pre-fetched by assist thread is already in level 1 cache when the main thread processes the data. In some programs, it is impossible to select a threshold that satisfies the two criteria. Previous solutions typically tried to choose a compromise pace difference.

System 600 depicts processor unit 104 and memory 106 from data processing 100 of FIG. 1. Processor unit 104 is further detailed to show processor 402, level 1 cache 404, level 2 cache 406 and level 3 cache 408 of FIG. 4. In addition, main thread 410 is depicted as bound to processor 402 as is assist thread 412, all of FIG. 4. System 600 is an example of an implementation of a main thread with multiple assist threads for pre-fetching data.

Processor unit 602 is further detailed to show processor 604, level 1 cache 606, level 2 cache 608 and sharing of level 3 cache 408 as well as memory 106. Second assist thread 612 is depicted as bound to processor 604.

As previously shown in an example of a single assist thread, a first pre-fetch 614 may be performed by an assist thread to move data from memory 106 to a level 3 cache 408. However in this example, assist thread 612 does not execute on processor 402 with main thread 410. Rather, assist thread 612 operates on another processor, such as processor 604. Processor 604 is, however, required to have access to the data to be pre-fetched and to include a processor core identifier of the target processor core, processor 402 in this example. First pre-fetch 614 has a capability to direct data to a processor core and to a cache level in the cache hierarchy. Assist thread 412 is now a second assist thread and moves the data further up the cache hierarchy from level 3 cache 408 into level 1 cache 404 using second pre-fetch 616. Assist thread 412 executes on processor 402 and does not require a processor core identifier as a target for movement of data from level 3 cache 408 into level 1 cache 404.

Compared with the single assist thread example of FIG. 4, system 600 has multiple assist threads operating across multiple processors to pre-fetch data. Further as depicted, the assist threads are not required to operate on the same processor. Data pre-fetch is shown as a cooperative data pre-fetch at different cache levels using multiple assist threads when necessary. The data is first pre-fetched into the cache far from the processor on which the main thread executes using a processor core identifier. The addresses are kept, and then pre-fetched into the cache close to a processor, such as level 1 cache 404 for example. The paces for pre-fetching to different level of cache are controlled separately.

For processor architectures that have processor cores that do not share level 1 and level 2 cache, the first pre-fetch along with the address calculation for pre-fetch can be performed with a chip multiprocessor (CMP) assist thread and second pre-fetch can be performed with simultaneous multithreaded (SMT) assist thread so that the data can be pre-fetched into a cache close to the processor.

The process utilizes the cache structure efficiently for the pre-fetch scheme. Since the level 3 cache is typically larger than level 1 cache, a larger pace difference between main thread and assist thread can be selected to hide the latency without introducing notable cache pollution. When the data is pre-fetched to level 1 cache, a smaller pace difference can be selected to control the progress of pre-fetch for level 1 cache. Since the latency for moving data from level 3 cache to level 1 cache is substantially shorter than the latency for moving data from memory to level 1 cache, the latency can be fully hidden while the chance of cache pollution is reduced. By combining the pre-fetches for different level of cache, we can fulfill the two goals at the same time: hide the latency and avoid cache pollution.

When multiple assist threads are used for the multiple-level pre-fetch, the level 3 cache may be used on another processor core, further reducing the chance of cache pollution. Since the second pre-fetch with simultaneous multithreaded (SMT) assist thread uses the recorded addresses, the problem of possible resource contention is greatly reduced.

One possible negative impact of pre-fetch is cache pollution. The pre-fetch may bring in useless data or data too early into a cache. Consequently, the useful data may be evicted from the cache and hurt the performance of the program. In order to reduce the chances of cache pollution, some architectures allow the pre-fetch instruction to specify which level of cache the pre-fetched data should be put into. When the data is put into larger and slower outer cache, for example level 3 cache, the chance of cache pollution is reduced, with the cost of higher access latency.

The possibility of cache pollution by pre-fetch is greatly reduced while the latency of memory load can be fully hidden by utilizing the cache capacity at different cache levels and even at different processor cores. The benefits of assist thread with chip multiprocessor (CMP) assist thread and simultaneous multithreaded (SMT) assist thread are both obtained by using multiple assist threads of differing types for differing cache levels cooperatively.

FIG. 7 is a textual representation of a code portion of a main thread with multiple assist threads implementation of FIG. 6, in accordance with one embodiment of the disclosure. Code snippet 700 presents statements 702 for a first assist thread 412 of FIG. 4 and statements 704 for second assist thread 612 of FIG. 6.

Statements 702 and statements 704 separate the activity of pre-fetching into separate operations by cache level. For example, statements 702 address the movement of data from memory into cache level 3 while statements 704 address the movement of data from cache level 3 into cache level 1. While the example provides code portions for two assist threads the example is not meant to be limiting. Other code portions may be added to have additional threads and additional cache levels processed.

Further as shown in statements 702 and statements 704 pacing may be controlled for each assist thread and main thread combination independently. Pre-fetch threshold used in controlling pre-fetch activity can therefore be made more specific to a data operation than in the prior examples containing only a single assist thread.

Figure 8:
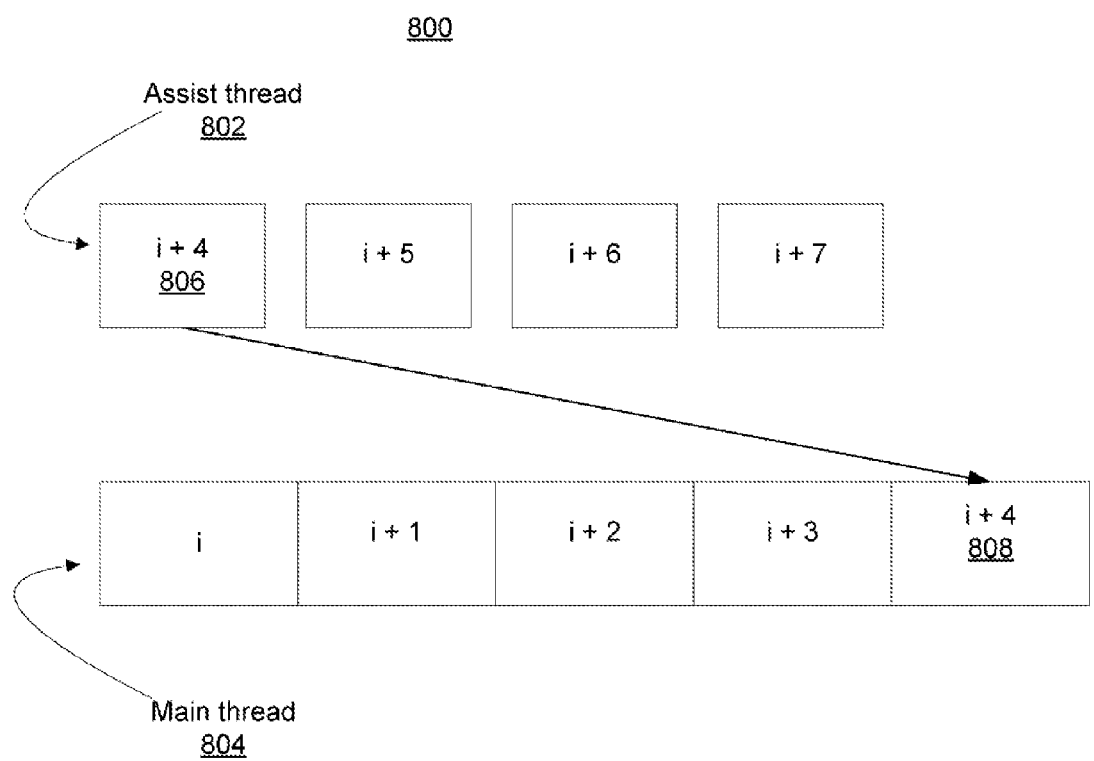
FIG. 8 is a block diagram of an execution sequence of a main thread with assist thread implementation of FIG. 4, in accordance with one embodiment of the disclosure.

FIG. 8 is a block diagram of an execution sequence of a main thread with assist thread implementation of FIG. 4, in accordance with one embodiment of the disclosure. Execution sequence 800 is an example of a single assist thread 802 split into a first and second pre-fetch operation, working in conjunction with main thread 804.

Using existing pre-fetch methods, the latency that can be hidden is proportional to the cache size required. In this example, the maximum pace difference between the assist thread 802 and the main thread 804 is 4 units.

Figure 9:
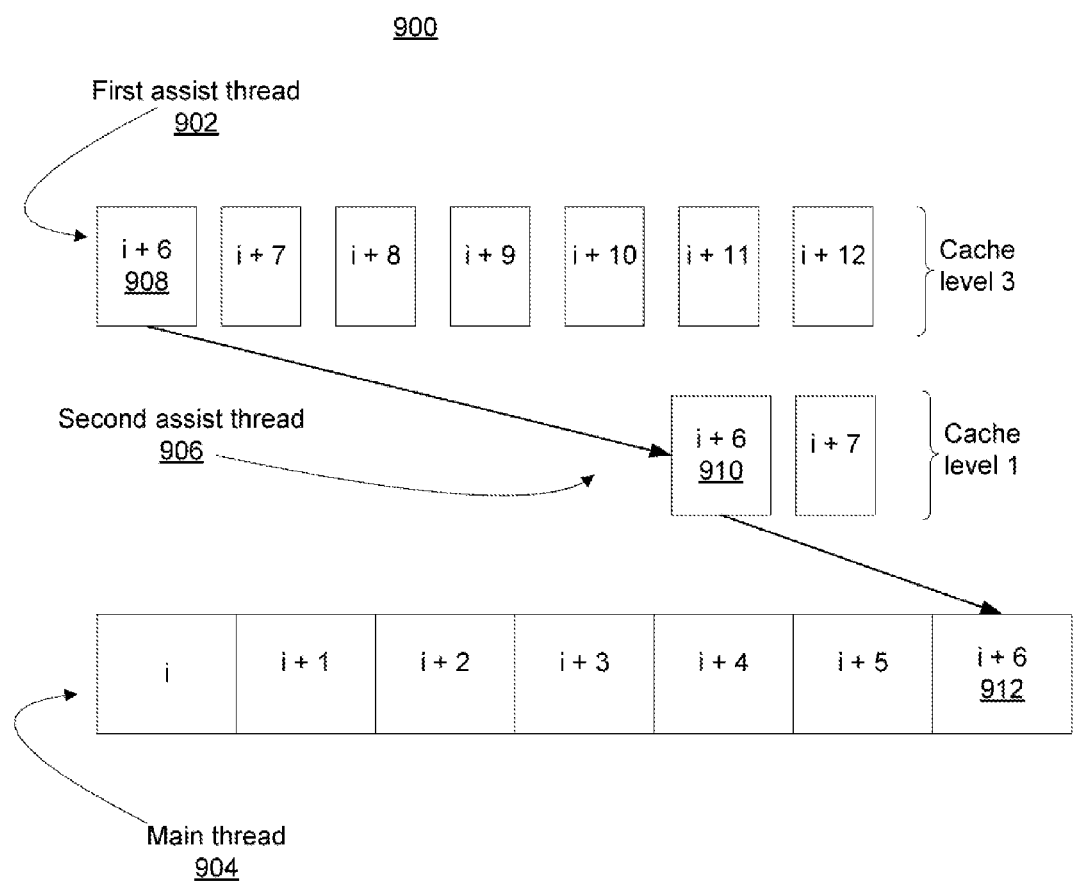
FIG. 9 is a block diagram of an execution sequence of a main thread with multiple assist threads implementation of FIG. 6, in accordance with one embodiment of the disclosure.

FIG. 9 is a block diagram of an execution sequence of a main thread with multiple assist threads implementation of FIG. 6, in accordance with one embodiment of the disclosure. The technique of a main thread with multiple assist threads implementation provides first thread 902 with main thread 904 and an additional second assist thread 906.

First assist thread 902 handles pre-fetch data into level 3 cache while second assist thread 906 handles pre-fetch data from level 3 cache into level 1 cache. The pace difference for a level 3 cache pre-fetch is assumed to be 6 units and the pace difference for level 1 cache pre-fetch is assumed to be 2 units.

The operations for a multiple-level pre-fetch can be split into two assist threads. Address calculation, bookkeeping and pre-fetch to level 3 cache can be done in an assist thread bound to the chip multiprocessor (CMP) assist thread to the main thread, the second pre-fetch to level 1 cache can be done in an assist thread bound to the simultaneous multithreaded (SMT) assist thread to the main thread.

Figure 10:
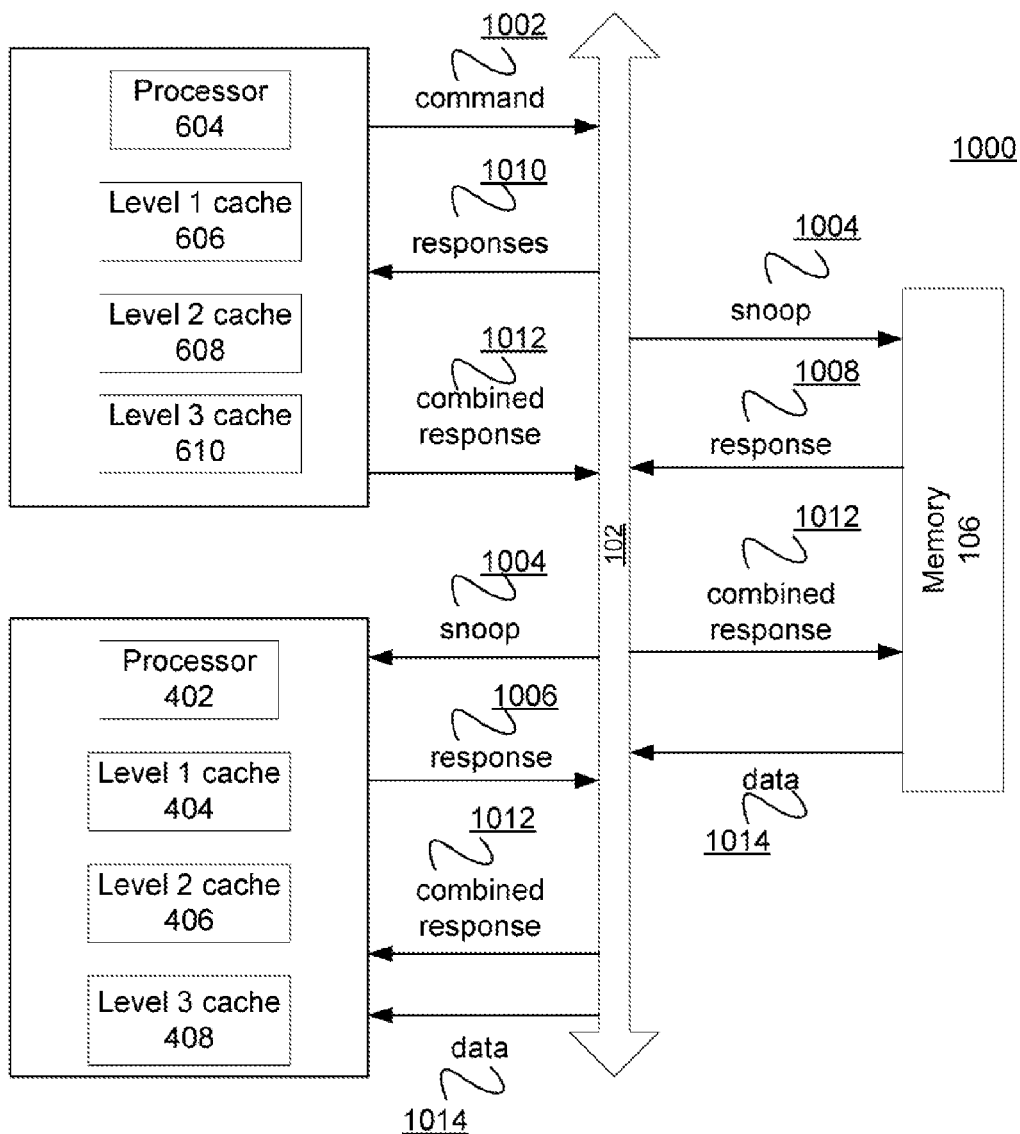
FIG. 10 is a block diagram of a command flow sequence of a first pre-fetch operation of FIG. 6, in accordance with one embodiment of the disclosure.

FIG. 10 is a block diagram of a command flow sequence of a first pre-fetch operation of FIG. 6, in accordance with one embodiment of the disclosure. Contrary to previous memory management implementations, the same processor that will consume the pre-fetched data does not have to issue pre-fetch instructions. The location in the memory hierarchy to which the data should be pre-fetched is assumed to have affinity to the processor or processor core from which the pre-fetch instruction is issued. Usually, the data is brought into the memory component near to the processor core in a first pre-fetch, and may be further elevated to a level 1 cache.

In one embodiment, process 1000 is an example of a command flow sequence process as used by compiler 202 of compilation system 200 of FIG. 2. Process 1000 is a further example of the multiple assist threads process in process 600 of FIG. 6. A new transaction flow to enable an assist thread on a processor core to issue a data pre-fetch request on the behalf of another processor core is presented. Process 1000 issues command 1002 from processor 604 to pre-fetch a cache line into one of the caches of processor 402 of FIG. 4. The cache that receives the pre-fetch data is normally the lowest level of cache or the level of cache at the point of coherency, such a level 3 cache 408 of FIG. 4. Without losing generality, the assumption is for a three level cache hierarchy and the pre-fetch cache lines directed to the level 3 caches. A first pre-fetch may be directed to any level of cache, however, in the example the first pre-fetch is directed to level 3 cache while a second pre-fetch moves the first pre-fetch data into a level 1 cache.

In one example, instructions for the commands may take the form of a set of arguments comprising op-code, address, cache-level, core-ID. Some existing systems may have a format of a pre-fetch instruction that takes an address and cache-level as parameters. In some systems, the cache-level is encoded in the op-code, or is set to level 1 only by default. The processor identifier, also known as a processor core identifier or core-ID, can be encoded with a fixed number of bits. For example, 7 bits reserved for core-ID can encode up to 128 cores or processor identifiers.

Processor 604 sends command 1002 to communication fabric 102. Communication fabric 102 of FIG. 1 reflects command 1002 as snoop 1004 requests to processor 402 and memory 106. Processor 604 is not the same processor as processor 402 but has access to memory 106 of FIG. 1 through communication fabric 102.

In response to snoop 1004 request, processor 402 sends back response 1006 indicating an ability to receive the cache line that is a target of the pre-fetch. Memory 106 also sends back response 1008 indicating a capability as to whether the cache line being requested can be provided.

After receiving responses 1010 from processor 402 and memory 106, processor 604 generates combined response 1012 and sends combined response 1012 to processor 402 and memory 106 through communication fabric 102. Combined response 1012 indicates one of three possible actions. When combined response 1012 indicates that processor 402 does not want to take the requested cache line because the cache line is already present in one of the caches of processor 402, the transaction completes and no further action is required.

When combined response 1012 indicates processor 402 or memory 106 is too busy, processor 604 will re-send command 1002 to the communication fabric 102. Processor 402 and memory 106 will take no further actions until receipt of snoop 1004 request from a re-sent command 1002 from processor 604. When combined response 1012 indicates the transaction can continue memory 106 sends out data 1014 through communication fabric 102 to processor 402 that puts the data into local level 3 cache 408 of FIG. 4 to complete the transaction.

In another embodiment, two transactions are used on communication fabric 102 by processor 604 to pre-fetch a cache line into level 3 cache 408 of processor 402. Processor 604 uses a first transaction to inform level 3 cache 408 of processor 402 to start to pre-fetch a cache line at a specified address. Level 3 cache 408 of processor 402 then uses a second transaction to issue a load request for the given address on communication fabric 102 to load the cache line from memory 106 or one of the caches in another processor by specifying a processor identifier, dependent on where the requested cache line resides.

In another embodiment, two transactions on communication fabric 102 for processor 604 are used to pre-fetch a cache line into level 3 cache 408 of processor 402. Processor 604 uses a first transaction to issue a load request to load the requested cache line into a temporary space of processor 604. Processor 604 then uses a second transaction to push or inject the data into level 3 cache 408 of processor 402. When the requested cache line is in one of the caches of processor 604, the first transaction will not be needed and processor 604 can directly send the cache line to processor 402. The compiler can perform the analysis presented in FIG. 11 to generate these new pre-fetch instructions.

Figure 11:
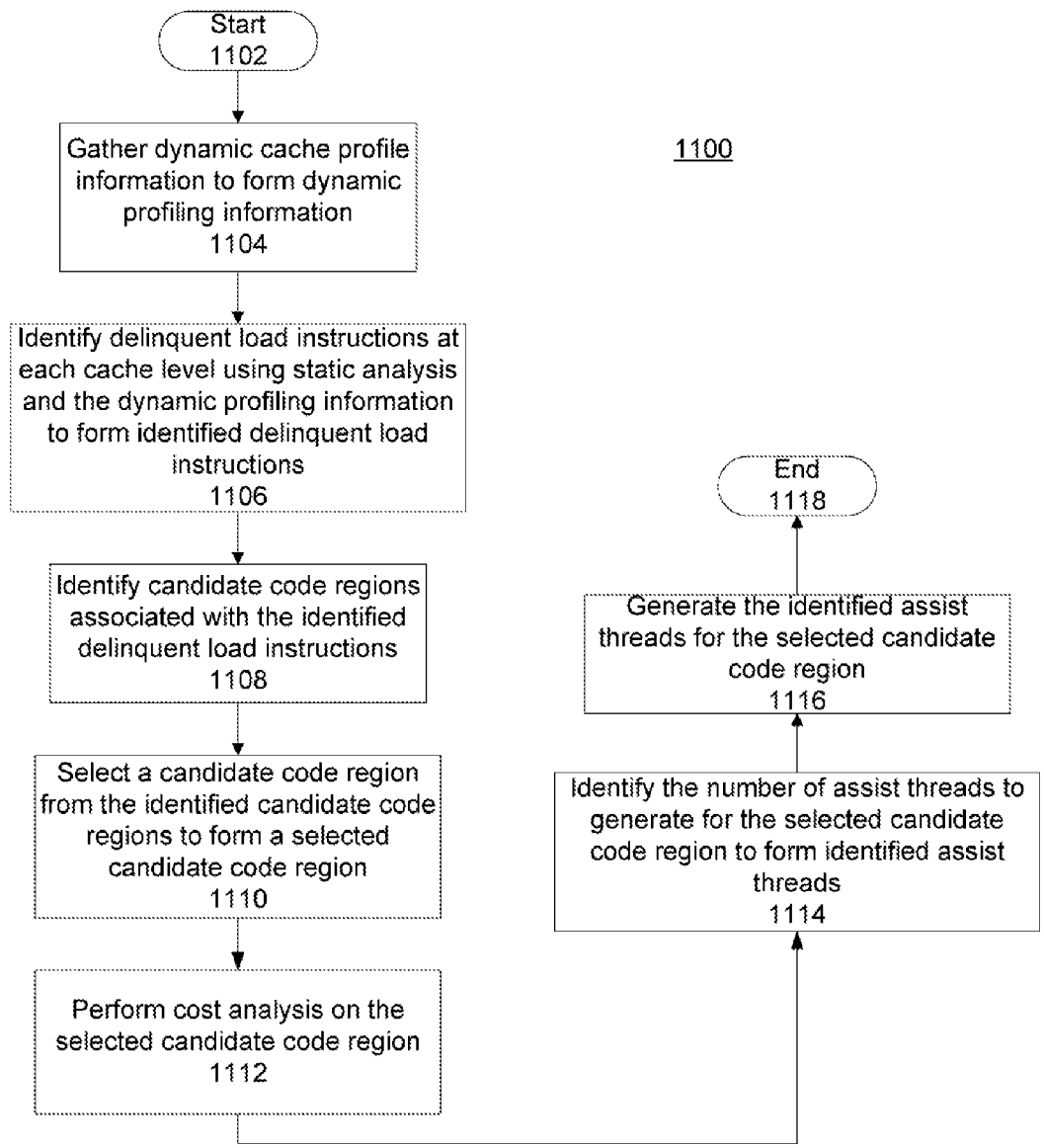
FIG. 11 is a flowchart of assist thread generation in a main thread with multiple assist threads implementation of FIG. 6, in accordance with one embodiment of the disclosure.

FIG. 11 is a flowchart of assist thread generation in cooperation with a main thread with multiple assist threads implementation of FIG. 6, in accordance with one embodiment of the disclosure. Process 1100 is an example of a process used in compilation system 200 of FIG. 2 for generation of a set of assist threads corresponding to a main thread for cooperative data pre-fetching with multiple levels of cache.

Process 1100 starts (step 1102) and gathers dynamic cache profile information to form dynamic profiling information (step 1104). Process 1100 identifies delinquent load instructions at each cache level using static analysis and the dynamic profiling information to form identified delinquent load instructions (step 1106). The differing cache levels can then have the respective load instructions handled in accordance with separate conditions based on the cache level requirements. For example, cache level based pre-fetch threshold values.

Identify candidate code regions associated with the identified delinquent load instructions is performed (step 1108). Segments of code associated with the identified delinquent load statements allow assist thread generation to target the respective code regions. Select a candidate code region from the identified candidate code regions to form a selected candidate code region (step 1110). Selection provides a capability to code regions differently. For example, there may be a preference to spend more assist resource on level 1 cache migration of pre-fetch data than a level 2 cache migration scenario would require for performance reasons.

Perform cost analysis on the selected candidate code region (step 1112). The costing provides a capability to quantify the resource required to support a particular pre-fetching scenario. Cost may be reflected in various unites or methods including cache lines, processor cycles, latency or execution times. Process 1100 identifies the number of assist threads to generate for the selected candidate code region to form identified assist threads (step 1114). The number of assist threads represents a set of assist threads associated with a main thread to ensure pre-fetch data targets are attained. Having identified the number of assist threads, generate the identified assist threads for the selected candidate code region per each cache level (step 1116) with process 1100 terminating thereafter (step 1118).

FIG. 12 is a flowchart of using a main thread with multiple assist threads implementation of FIG. 6, in accordance with one embodiment of the disclosure. Process 1200 is an example of a process of using compilation system 200 of FIG. 2 to manage multiple speculative assist threads for differing cache levels for data pre-fetching within a data processing system.

Process 1200 starts (step 1202) and receives a request for data to form requested data (step 1204). Responsive to the requested data, determine whether a difference between a pace of a first assist thread and a main thread is less than a first predefined value (step 1206). When a determination is made that a pace of a first assist thread is less than the first predefined value, a "yes" result is obtained. When a determination is made that a pace of a first assist thread is not less than the first predefined value, a "no" result is obtained. When a "no" result is received in step 1206, process 1200 skips to step 1220. When a "yes" result is received in step 1206, process 1200 determines whether space exists in a first cache (step 1208).

When a determination is made that space exists in a first cache, a "yes" result is received. When a determination is made that space does not exist in a first cache, a "no" result is received. When a "no" result is received in step 1208, process 1200 evicts oldest first pre-fetch data (step 1218). The oldest pre-fetch data is removed or over-written with new data. When a "yes" result is received process 1200 moves data associated with the requested data from a memory, by the first assist thread bound to a first processor, into a first cache to form a first pre-fetch data (step 1210).

Process 1200 determines whether a difference between a pace of a second assist thread and a main thread is less than a second predefined value (step 1212). When a determination is made that a pace of a second assist thread is less than a second predefined value, a "yes" result is received. When a determination is made that a pace of a second assist thread is not less than a second predefined value, a "no" result is obtained. When a "no" result is received in step 1212, process 1200 skips to step 1220. When a "yes" result is obtained move the first pre-fetch data by the second assist thread bound to a second processor into a second cache associated with the second processor to form a second pre-fetch data (step 1214).

Process 1200 determines whether a difference between the pace of the first assist thread and the pace of the second assist thread is less than a predetermined threshold (step 1216). When a determination is made that a difference between the pace of the first assist thread and the pace of the second assist thread is less than a predetermined threshold, a "yes" result is obtained. When a determination is made that a difference between the pace of the first assist thread and the pace of the second assist thread is not less than a predetermined threshold, a "no" result is obtained. When a "no" result is obtained in step 1216, process 1200 adjusts the pace of the assist threads (step 1220). When a "yes" result is obtained in step 1216, process 1200 determines whether more data associated with the requested data exists (step 1222).

When a determination is made that more data associated with the requested data exists, a "yes" result is obtained. When a determination is made that more data associated with the requested data does not exist, a "no" result is obtained. When a "no" result is obtained in step 1222, process 1200 terminates (step 1224). When a "yes" result is obtained in step 1220, process 1200 loops back to step 1206 to continue.

Illustrative embodiments thus provide a process, apparatus and program product for data pre-fetching using cooperative data pre-fetch at different cache levels using multiple assist threads when necessary. In an illustrative embodiment, a computer-implemented process for managing multiple speculative assist threads for data pre-fetching sends a command from an assist thread of a first processor to a second processor and a memory, wherein parameters of the command specify a processor identifier of the second processor. Responsive to receiving the command, a reply by the second processor indicates an ability to receive a cache line that is a target of a pre-fetch and, responsive to receiving the command, reply by the memory indicating a capability to provide the cache line. Responsive to receiving replies from the second processor and the memory, the first processor sends a combined response to the second processor and the memory, wherein the combined response indicates an action. Responsive to the action indicating a transaction can continue, sending the requested cache line, by the memory, to the second processor into a target cache level on the second processor.

The data is first pre-fetched into a cache located relatively far from the processor; for example, a level 3 cache, the addresses are kept, and then pre-fetched into the cache close to the processor; for example, level 1 cache. The pace for pre-fetching to different level of cache may be controlled separately.

For processor architectures in which processor cores do not share level 1 cache and level 2 cache, the first pre-fetch along with the address calculation for the pre-fetch can be performed with a chip multiprocessor assist thread, and second pre-fetch can be performed with a simultaneous multi-threaded thread so that the data can be pre-fetched into a cache close to the respective processor.

Thus is provided a capability to utilize the pre-fetch instructions for different levels of cache and from different processors. First, the data is pre-fetched into a level 3 cache. Since level 3 cache is quite large, a larger pace difference between an assist thread and the main thread is allowed without causing cache pollution for the level 3 cache. As a result, the pre-fetched data can be ready when the data is required for use. When data is pre-fetched to level 3 cache, the addresses of the data are recorded in a buffer. A circular buffer can be used for this purpose. The useful data to be kept is limited by the threshold of a pace difference between the assist thread and the main thread.

To further reduce the latency of access data from level 3 cache, data is pre-fetched into a level 1 cache. The data is supposed to be already in level 3 cache, and the latency to access from level 3 cache is much shorter than the latency to access from the main memory. A smaller pace difference for level 1 cache pre-fetch can be selected so that there will typically be no cache pollution for the smaller level 1 cache, while the latency can be fully hidden.

Illustrative embodiments thus provide a process, a computer program product and an apparatus for managing multiple speculative assist threads for data pre-fetching. The illustrative embodiments further provide a capability to gather dynamic cache profiling information to form dynamic profiling information, identify delinquent load instructions at each cache level using static analysis and the dynamic profiling information to form identified delinquent load instructions, identify candidate code regions associated with the identified delinquent load instructions, and select a candidate code region from the identified code regions to form a selected candidate code region. A cost analysis can be performed on the selected candidate code region to identify a number of assist threads to generate the selected candidate code region to form the number of identified assist threads. A number of identified assist threads for the selected candidate code region are generated, wherein an assist thread is generated per each cache level and execution of the number of identified assist threads for the selected candidate code region occurs.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing medium actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms; for example, radio frequency and light wave transmissions. The computer readable medium may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including, but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, comprising:
    sending a first command from a first assist thread bound to a first processor to a second processor and a memory, where the first command comprises a processor core argument that identifies the second processor and an instruction to pre-fetch a cache line;
    responsive to the first command, sending a first reply from the second processor, the first reply comprising an indication of an ability to receive the cache line;
    responsive to the first command, sending a second reply from the memory, the second reply comprising an indication of an ability to provide the cache line;
    responsive to receiving the first reply and the second reply, sending a combined response from the first processor to the second processor and the memory, the combined response comprising an indication to continue the instruction to pre-fetch the cache line; and
    responsive to the combined response, sending the cache line from the memory to the second processor and into a first cache of the second processor.

2. The method of claim 1, where the first command further comprises a cache level argument that identifies a first cache level, the first cache of the second processor being at the first cache level.

3. The method of claim 1, further comprising:
    responsive to a second command from a second assist thread bound to the second processor, moving the cache line from the first cache of the second processor to a second cache of the second processor, where the second cache of the second processor is at least one cache level above the first cache of the second processor.

4. The method of claim 1, further comprising:
    gathering dynamic cache profiling information;
    identifying a delinquent load instruction using static analysis and the dynamic cache profiling information;
    identifying a code region associated with the delinquent load instruction; and
    generating a second assist thread for the code region, where the second assist thread is bound to the second processor.

5. The method of claim 1, further comprising:
determining whether a difference between a pace of the first assist thread and a main thread is less than a predefined value; and
responsive to a determination that the difference between the pace of the first assist thread and the main thread is less than the predefined value, determining whether space exists in the first cache of the second processor.

6. The method of claim 5, further comprising:
responsive to a determination that space does not exist in the first cache of the second processor, evicting old pre-fetch data from the first cache of the second processor.

7. The method of claim 1, further comprising:
determining whether a difference between a pace of a second assist thread and a main thread is less than a predefined value; and
responsive to a determination that the difference between the pace of the second assist thread and the main thread is less than the predefined value, moving the cache line by the second assist thread from the first cache of the second processor into a second cache of the second processor, where the second cache of the second processor is at least one level above the first cache of the second processor.

8. A computer program product comprising a non-transitory computer readable storage medium having computer readable program code embodied therewith, the computer readable program code comprising:
computer readable program code configured to send a first command from a first assist thread bound to a first processor to a second processor and a memory, where the first command comprises a processor core argument that identifies the second processor and an instruction to pre-fetch a cache line;
computer readable program code configured to send a first reply from the second processor in response to the first command, the first reply comprising an indication of an ability to receive the cache line;
computer readable program code configured to send a second reply from the memory in response to the first command, the second reply comprising an indication of an ability to provide the cache line;
computer readable program code configured to send a combined response from the first processor to the second processor and the memory in response to receiving the first reply and the second reply, the combined response comprising an indication to continue the instruction to pre-fetch the cache line; and
computer readable program code configured to send the cache line from the memory to the second processor and into a first cache of the second processor in response to the combined response.

9. The computer program product of claim 8, where the first command further comprises a cache level argument that identifies a first cache level, the first cache of the second processor being at the first cache level.

10. The computer program product of 8, further comprising:
computer readable program code configured to move the cache line from the first cache of the second processor to a second cache of the second processor in response to a second command from a second assist thread bound to the second processor, where the second cache of the second processor is at least one cache level above the first cache of the second processor.

11. The computer program product of claim 8, further comprising:
computer readable program code configured to gather dynamic cache profiling information;
computer readable program code configured to identify a delinquent load instruction using static analysis and the dynamic cache profiling information;
computer readable program code configured to identify a code region associated with the delinquent load instruction; and
computer readable program code configured to generate a second assist thread for the code region, where the second assist thread is bound to the second processor.

12. The computer program product of claim 8, further comprising:
computer readable program code configured to determine whether a difference between a pace of the first assist thread and a main thread is less than a predefined value; and
computer readable program code configured to determine whether space exists in the first cache of the second processor in response to a determination that the difference between the pace of the first assist thread and the main thread is less than the predefined value.

13. The computer program product of claim 12, further comprising:
computer readable program code configured to evict old pre-fetch data from the first cache of the second processor in response to a determination that space does not exist in the first cache of the second processor.

14. The computer program product of claim 8, further comprising:
computer readable program code configured to determine whether a difference between a pace of a second assist thread and a main thread is less than a predefined value; and
computer readable program code configured to move the cache line by the second assist thread from the first cache of the second processor into a second cache of the second processor in response to a determination that the difference between the pace of the second assist thread and the main thread is less than the predefined value, where the second cache of the second processor is at least one level above the first cache of the second processor.

15. An apparatus, comprising:
a storage device comprising a memory and computer executable program code; and
a processor unit comprising a first processor and a second processor, the processor unit being coupled to the storage device, where the processor unit executes the computer executable program code to direct the apparatus to:
send a first command from a first assist thread bound to the first processor to the second processor and the memory, where the first command comprises a processor core argument that identifies the second processor and an instruction to pre-fetch a cache line;
send a first reply from the second processor in response to the first command, the first reply comprising an indication of an ability to receive the cache line;
send a second reply from the memory in response to the first command, the second reply comprising an indication of an ability to provide the cache line;
send a combined response from the first processor to the second processor and the memory in response to receiving the first reply and the second reply, the combined response comprising an indication to continue the instruction to pre-fetch the cache line; and send the cache line from the memory to the second processor and into a first cache of the second processor in response to the combined response.

16. The apparatus of claim 15, where the first command further comprises a cache level argument that identifies a first cache level, the first cache of the second processor being at the first cache level.

17. The apparatus of claim 15, where the processor unit further executes the computer executable program code to direct the apparatus to move the cache line from the first cache of the second processor to a second cache of the second processor in response to a second command from a second assist thread bound to the second processor, where the second cache of the second processor is at least one cache level above the first cache of the second processor.

18. The apparatus of claim 15, where the processor unit further executes the computer executable program code to direct the apparatus to:
  gather dynamic cache profiling information;
  identify a delinquent load instruction using static analysis and the dynamic cache profiling information;
  identify a code region associated with the delinquent load instruction; and
  generate a second assist thread for the code region, where the second assist thread is bound to the second processor.

19. The apparatus of claim 15, where the processor unit further executes the computer executable program code to direct the apparatus to:
  determine whether a difference between a pace of the first assist thread and a main thread is less than a predefined value; and
  determine whether space exists in the first cache of the second processor in response to a determination that the difference between the pace of the first assist thread and the main thread is less than the predefined value.

20. The apparatus of claim 19, where the processor unit further executes the computer executable program code to direct the apparatus to evict old pre-fetch data from the first cache of the second processor in response to a determination that space does not exist in the first cache of the second processor.

* * * * *